May 21, 1963　　　　J. W. BLACK　　　　3,090,637
CASTERED WIRE DOLLY
Filed Dec. 17, 1959
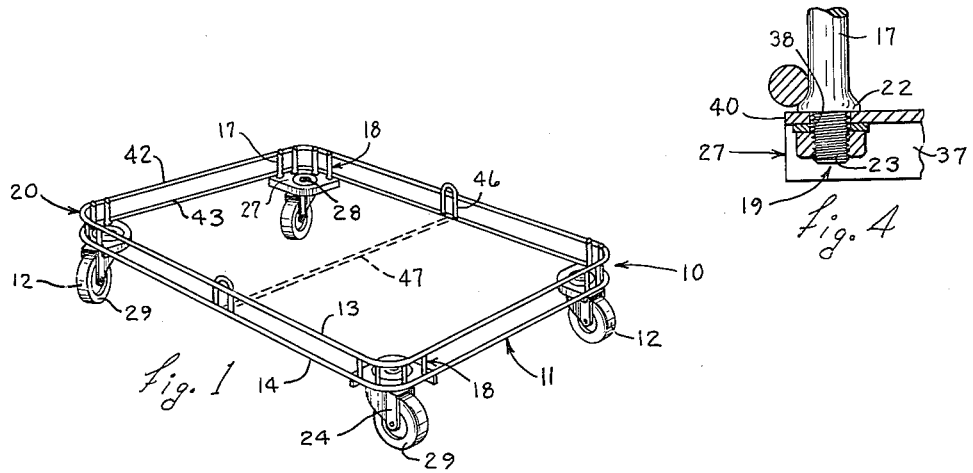
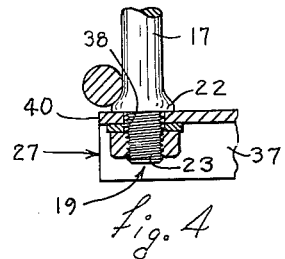
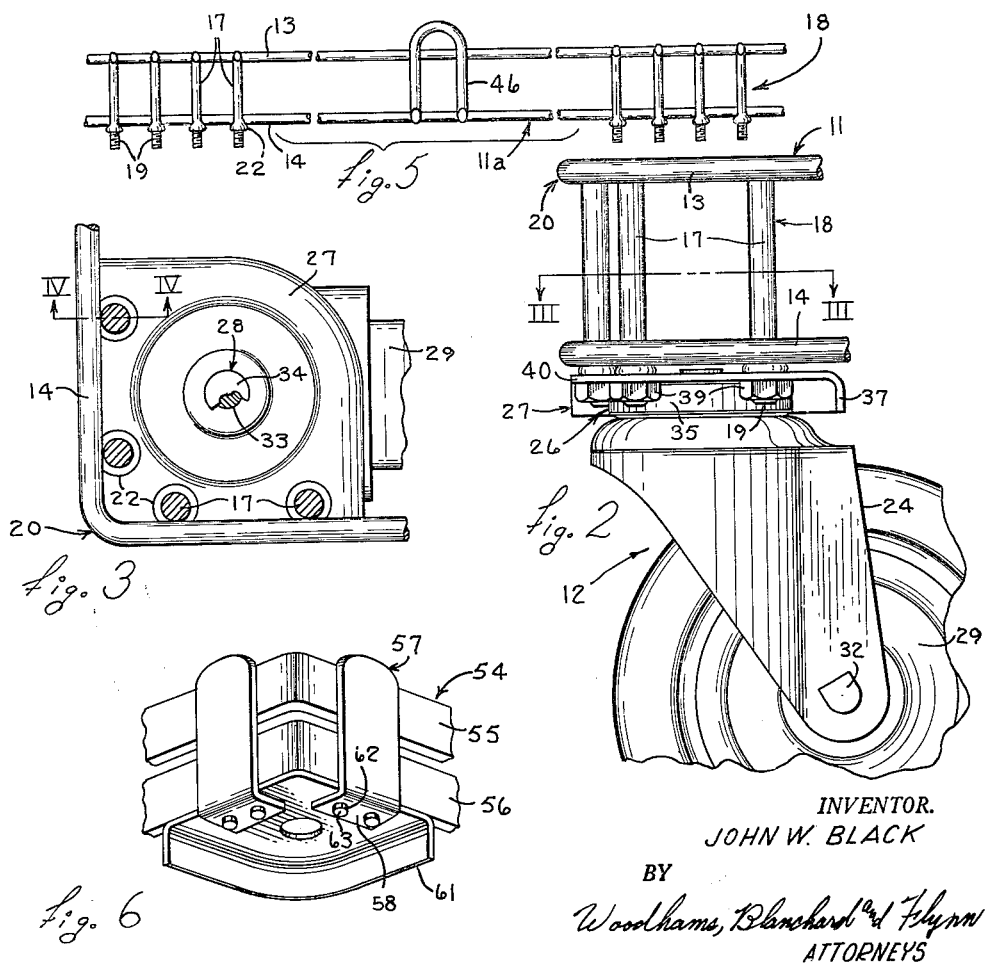
INVENTOR.
JOHN W. BLACK
BY Woodhams, Blanchard and Flynn
ATTORNEYS

3,090,637
CASTERED WIRE DOLLY
John W. Black, Prairieville Township, Barry County, Mich., assignor to Pemco Wheel Company, Kalamazoo, Mich., a corporation of Michigan
Filed Dec. 17, 1959, Ser. No. 860,243
4 Claims. (Cl. 280—79.1)

This invention relates to wheeled vehicles and it relates particularly to a type of wheeled vehicle, commonly known as a dolly, which can be fabricated in a continuous strip formed in a repeating pattern which is then separated into segments and the segments assembled with suitable casters to form dollies.

While the manufacture and use of wheeled platforms, including those known as dollies, is an extremely old art, it is largely of the nature requiring individual treatment of the unit itself and relatively little has been done toward rendering such products fabricable by a continuous, or substantially continuous process. In the previous common methods of manufacturing dollies, suitable parts were cut, usually from angle iron or tubing, to form the desired shape, usually rectangular, for the dolly and were then welded or otherwise fastened together and provided with suitable casters. This required considerable fabrication time and labor and was a substantial cost-producing factor. Thus, substantial economies can be obtained over the conventional construction of dollies if the body portion thereof can be formed as a continuous process on automatic, or semi-automatic, machinery so that the actual cutting and assembling of the parts is reduced to a minimum.

Having discovered the concept of fabricating the frame structures for wheeled platforms or carriers by a substantially automatic and continuous procedure, it was then discovered that wire-form materials were especially well suited for frame structures of this type. For example, wire-form materials can be provided in very long lengths which are easily fed into and handled by bending and/or welding machines. Moreover, wire-form materials are ideally suited to resistance welding operations, which can be easily adapted to high speed, production procedures.

Dollies are subject, as is well known, to extremely rough usage and yet their performance must be reliable and the operation of the casters must continue to be relatively easy, both as to the rotation of the wheel and as to the pivotal movement of the caster portion. Thus, in reducing the cost of dollies and providing a dolly construction adaptable to fabrication by at least partially automatic steps, it must be borne in mind that such objectives cannot be obtained at the sacrifice of strength and stability in the resulting product. However, it has been found that wire-form materials can be used to provide articles of this type which have adequate strength, particularly in regions where strength is necessary, and a minimum of weight, hence cost.

In the manufacture of dollies for both industrial use and a wide variety of other uses, an appreciable portion of the price to the ultimate customer originates in transportation costs. This transportation cost could be materially reduced if the dollies could be shipped in a knocked-down condition and assembled by the customers. That is, the knocked-down condition requires less shipping space and, in many instances, the wire-form materials will be of lighter weight than other materials required for the same purpose.

Dollies are often purchased in small quantities or in special sizes and shapes to meet particular needs. According to present practices the "set-up" time for a special size or shape becomes a material cost factor in small orders. If the particular size or shape has not been previously made, then substantial additional tooling costs are also sometimes involved. These costs must either be amortized in the price of the units or absorbed by the manufacturer. As a result, some potential users of such dollies forego their use for economic reasons, and many users accept a "stock" size which is not entirely satisfactory, but is much less costly.

In addition to the above features, it is known that wire-form materials are easier to clean and tend to remain clean longer than many other types of materials which might be used for this purpose. However, it will be recognized that the invention is not limited to the use of wire-form materials.

An object of this invention has been the provision of a frame structure for a castered dolly, which is rigid and durable, yet relatively light in weight, and which can be easily adapted to a variety of sizes and shapes with little or no additional tooling and with a minimum of "set-up" time, whereby orders involving small quantities of dollies in special sizes and shapes can be filled promptly at a unit cost which is not materially greater, in so far as production costs are concerned, than the unit cost for large orders of the same dollies or even stock sizes.

A further object of this invention has been the provision of a frame structure for a castered dolly which is extremely easy to maintain, primarily as a result of the ease with which the casters can be mounted upon or removed from the dolly frame, and which can be partially fabricated and shipped in an unassembled condition requiring only a fraction of the shipping space, which the completely fabricated and assembled dolly would normally occupy, after which the fabrication and assembly can be completed quickly and easily by performing minor operations.

A further object of this invention has been the provision of a wheeled vehicle, such as a castered dolly, wherein the load can be supported substantially directly upon the casters, wherein the plates of a plurality of plate type casters become part of the dolly frame and wherein said casters can be removed and replaced quickly and easily by disconnecting their plates from the remainder of the dolly frame.

A further object of the invention has been to provide a castered dolly construction which is strong and sturdy and capable of withstanding rigorous use.

A further object of this invention has been the provision of a castered dolly construction as aforesaid, which can be fabricated and assembled at less cost than many existing dolly constructions for the same or similar purposes, which has a pleasing appearance, and which minimizes the materials and parts utilized in the frame and the operations required for fabrication and assembly.

Other objects and purposes of this invention will become apparent to persons familiar with this type of equipment upon reading the following specification and examining the accompanying drawings, in which:

FIGURE 1 is a perspective view of a castered dolly embodying the invention.

FIGURE 2 is an enlarged fragment of FIGURE 1 showing one corner of said castered dolly.

FIGURE 3 is a sectional view taken along the line III—III in FIGURE 2.

FIGURE 4 is a sectional view taken along the line IV—IV in FIGURE 3.

FIGURE 5 is a fragment of the dolly frame structure.

FIGURE 6 is a fragment of an alternate frame construction showing one corner thereof.

For convenience in description, the terms "upper," "lower" and derivatives thereof will have reference to the dolly construction, and parts thereof, as appearing in FIGURE 2. The terms "inner," "outer" and derivatives thereof will have reference to the geometric center of said dolly construction and parts associated therewith.

General Description

The objects and purposes of the invention, including those set forth above, have been met by providing a castered dolly comprised of a frame structure mounted upon a plurality of plate type casters wherein the plates of the casters may become a part of the load supporting body of the dolly. The dolly frame structure, which is fabricated according to the teachings of the invention, is comprised of one or more, but preferably two, elongated substantially rigid frame members which are positioned in parallel spaced relationship, after which a plurality of similar mounting elements are arranged in spaced groups crosswise thereof and secured to said members. The frame members, with the mounting elements secured thereto, are then bent to the desired shape for the finished dolly and the opposite ends of the frame members are secured together to form the frame structure of the dolly. The groups of mounting elements are positioned along the frame members so that, when the frame structure is completed, said elements will be located where it is desired to mount the casters upon the dolly frame. Such mounting is effected by securing the elements to the plates of the casters.

In one preferred embodiment of the invention, the mounting elements are rods which extend substantially in the same direction beyond one of the frame members. The extended ends of the mounting elements are threaded and slidably receivable through suitable openings in the plates of the plate casters for threaded engagement by nuts, which hold the casters in position with respect to the dolly frame. It will be apparent that a great many different frame configurations and dolly shapes can be created while following the teachings of the invention disclosed in this application. Accordingly, it will be understood that the specific structure described hereinafter is intended for disclosing a representative apparatus.

Detailed Construction

The castered dolly 10, which has been selected to illustrate the invention, is comprised of a frame structure 11, which is supported upon a plurality of plate-type casters 12.

The frame structure 11 is comprised of upper and lower, substantially rectangular frame members 13 and 14 which, in this particular embodiment, are substantially identical. Said frame members 13 and 14 preferably are fabricated from a pair of similar metal rods which are held in spaced, parallel relationship with respect to each other by plurality of transverse mounting elements 17. Said mounting elements 17 are arranged in space groups 18 which are positioned along the frame members 13 and 14 so that they will eventually be located at the corners 20 of the frame structure 11. Said mounting elements 17 are preferably fabricated from metal and are secured, as by welding, to the inner surfaces of said frame members.

The lower ends 19 of the mounting elements 17 extend below the lower frame member 14 in a direction preferably perpendicular to said frame member 14. The lower ends 19 (FIGURE 4) of the elements 17 have integral annular flanges 22 adjacent to the frame member 14 and said lower ends have threads 23 below said flanges 22.

The casters 12 (FIGURE 1) are preferably of the plate type wherein a yoke 24 (FIGURE 2) is supported by the ball bearing assembly 26 and the king pin 28 upon a plate 27. A wheel 29 is rotatably supported by means of the axle 32 upon the yoke 24 in a substantially conventional manner, so that said wheel is castered. For a more detailed disclosure of the yoke and bearing assembly of the plate-type caster suited for use in this invention, reference is made to my patent application Serial No. 678,287, now Patent No. 2,944,280, entitled "Caster Swivel Construction," and assigned to the assignee of this application.

The plate 27 (FIGURE 3) is substantially rectangular in this particular embodiment and it has a central pin opening 33 through which the king pin 28 is received. The upper end of the king pin 28 is upset, as by a forging operation, to form a head 34 engaging the upper surface of the plate 27. The plate 27 is rigidly held between the head 34 and the upper retaining ring 35 (FIGURE 2) of the bearing assembly 26. The pin opening 33 in said plate 27 and the portion of the king pin 28 extending therethrough may have cooperating out-of-round contours which further prevent relative rotation between said plate 27 and pin 28. The edge of the plate 27 facing inwardly of the frame structure 11 has a downwardly extending, integral flange 37 which extends from one side of the frame member 14 around to the other side thereof at the corner 20 of the frame structure, for the purpose of stiffening the plate 27.

The plate 27 (FIGURE 4) is provided with a plurality, here four, of mounting element openings 38 which are relatively arranged so that the lower, threaded ends 19 of the mounting elements 17 in a group 18 adjacent to a corner 20 are slidably and simultaneously receivable through and into the openings 38. Nuts 39 (FIGURE 2) are threadedly engaged with the threads 23 on each element 17 for rigidly securing said plate 27 with respect to the elements 17, hence with respect to the frame structure 11. The outer edge 40 (FIGURE 2) of the plate 27 preferably lies beneath, and follows the contour of, the lower frame member 14 at the corner 20 of the frame structure.

Fabrication and Operation

The castered dolly 10 may be fabricated by placing a pair of elongated, preferably similar frame members in parallel spaced relationship, as appearing in FIGURE 5. A plurality of mounting elements 17, placed adjacent to the frame members 13 and 14, said elements preferably being provided with flanges 22 and threads 23, are arranged so that they extend perpendicularly with respect to said frame members. This may be accomplished either manually or substantially automatically by using appropriate jigs associated with a suitable support structure (not shown). The frame elements 17 are then rigidly secured to the frame members 13 and 14 as convenient, preferably by a conventional welding or brazing operation. The resultant frame structure 11 (FIGURE 5) is bent, as by means of a suitable brake (not shown), preferably between the two centermost mounting elements 17 in each group 18 of mounting elements to form the corners 20 in the rectangular frame structure 11. The ends of the frame members 13 and 14 are secured together at the joints 42 and 43, respectively, by any convenient method, such as welding.

After the frame structure 11 has been completed, approximately as appearing in FIGURE 1, the mounting elements are inserted into the frame element openings 38 and threadedly engaged by the nuts 39 whereby the casters are rigidly secured to the frame structure 11.

It will be seen that, if desired, an article, such as a box of proper size, can be placed in the frame structure 11 so that its four corners rest upon the plates 27 located in the corners 20. Thus, the load may be supported directly upon the caster plates 27 and the frame structure under such usage serves primarily (1) to prevent shifting of the load with respect to the casters (2) to maintain said casters in upright operating positions at all times, and (3) to hold said casters 12 in fixed positions with respect to each other.

The frame structure 11 may actually be subjected to only a minor portion of the total force applied to the dolly in supporting a load. That is, a load supported by the dolly 10 is often applied directly to the caster plates 27 and is not applied to the frame structure 11.

In such case, very little or none of the weight of the load is directly supported by the frame structure 11.

Where, as here, the wheels 29 are castered, the center of engagement between the yoke 24 and plate 27 is offset horizontally and transversely from the axle 32. Thus, at least a part, but usually a minor part, of downward force created by the load is converted into a torque around the axle 32, in a counterclockwise direction as appearing in FIGURE 2. This torque is opposed by the frame members 13 and 14 which may be flexed adjacent to the plate 27, in one direction or another, in opposing the torque. The frame structure 11 must be of sufficient strength and rigidity that it will effectively oppose any appreciable flexing of the frame members 13 and 14 resulting from the torque created by the load mounted upon the caster plates 27. However, the torque thusly applied to the frame structure 11 is usually much less than the force which would be applied to said frame structure 11 if the load were supported directly upon the frame members 13 and 14. Accordingly, it follows that the frame structure 11 can be fabricated from much lighter materials having a far less strength weight and cost than the materials normally required in a dolly having a frame structure specifically designed for engaging and supporting the entire load, and thereafter transferring the support of such a load to the casters.

Under some circumstances, it may be desirable to provide additional transverse elements 46 along the sides of the frame structure 11 and intermediate the groups 18 of mounting elements 17. Moreover, it may also be desirable under some circumstances to provide auxiliary cross bars 47 which extend between the opposite sides of the frame structure 11, as shown in broken lines in FIGURE 1. Such cross bars may serve to brace the frame structure 11 where the distance between corners is relatively large. Said cross bars may also serve as auxiliary support elements, particularly where the dolly 10 is utilized to support a plurality of articles which are small in size and/or light in weight. In fact, an important characteristic of the structure of the invention is its adaptability without material modification both to the support of one large and heavy article and to the support of a plurality of small, light weight articles.

It will be seen that the replacement of casters 12 can be effected easily and quickly simply by loosening the nuts 39 and disengaging the plate 27 from the lower ends of the frame elements 17, to which it is secured, and putting a new one into place.

*Alternate Structure*

FIGURE 6 discloses the corner construction of an alternate frame structure 54 for a dolly embodying the invention. Said frame structure 54 is comprised of a pair of elongated frame members 55 and 56 which are held in spaced, parallel relationship by means of mounting elements 57, which are secured, as by welding, to said frame members. The mounting elements are substantially L-shaped and have lower, horizontal flanges 58 which extend inwardly below the lower frame member 56. The flanges 58 are spaced downwardly from the frame 56 a distance approximately equal to the thickness of the plate 61 of a caster (not shown) which may be substantially identical to the caster 12 shown in FIGURE 1. Each flange 58 has a pair of threaded openings 62 which are aligned with openings in the plate 61 similar to the openings 38 in the plate 27 (FIGURE 4). Screws 63 are slidably received through the openings in the plate 61 and threadedly engaged with the openings 62 in the flanges 58 whereby the plate 61 is rigidly secured with respect to the mounting elements 57, hence with respect to the alternate frame structure 54.

Although particular preferred embodiments of the invention have been disclosed above for illustrative purposes, it will be understood that variations or modifications in such disclosure, which come within the scope of the appended claims, are fully contemplated.

What is claimed is:

1. A castered dolly comprising: a pair of similar, elongated members arranged in similar, spaced and substantially superimposed rectangles defining a pair of substantially parallel planes; a plurality of similar, rigid elements secured to, and extending substantially perpendicularly between said members, said elements being arranged in a plurality of spaced groups, one group being located at each of the corners of said rectangles and including two elements located on opposite sides of the corner, one end of each element in said corner groups of elements extending through and beyond one of said planes in a direction away from the other of said planes; a plurality of plate type casters, each including a substantially flat plate having openings aligned with the elements of a said corner group and receiving the extended ends thereof; and means securing said extended ends of said group of elements with respect to said plate, said casters each including a rotatable wheel and means supporting same below said plate for swiveling movement about a vertical axis, said last-named means being secured to said plate at a point offset sidewardly from said elements, the upper surface of each caster being substantially flat.

2. The structure of claim 1 wherein said groups of elements are secured to the inner surface of said members and their extended ends are threaded; and wherein said caster plates are mounted upon said threaded ends and held in position with respect thereto by nuts.

3. A castered dolly comprising:
 a pair of similar rod members arranged in similar, spaced and substantially superimposed rectangles defining a pair of substantially parallel planes;
 a plurality of similar, spaced and rigid elements secured to, and extending between, said members, said elements being arranged in a plurality of spaced groups, one group being located at each of the corners of said rectangles and including two elements located on opposite sides of the corner, one end of each element in said corner groups of elements extending through and beyond one of said planes in a direction away from the other of said planes;
 a plurality of plate type casters, each caster including a substantially flat plate engaged with the elements of a said corner group; and
 means securing said extended ends of said group of elements to said plate, said casters each including a rotatable wheel and means supporting same below said plate for swiveling movement about an axis substantially perpendicular to said plane, said last-named means being secured to said plate at a point offset sidewardly from said elements.

4. A castered dolly, comprising:
 a pair of similar, elongated and endless members disposed in substantially superimposed positions and defining a pair of parallel, vertically spaced planes;
 a plurality of spaced rods secured to and extending between said members transverse to said planes, said rods being arranged in a plurality of spaced groups and each group containing at least two rods, the lower ends of the rods being threaded and extending below the lower endless member;
 at least three casters, each caster including a substantially flat plate parallel with, adjacent to and below said lower endless member and extending inwardly therefrom, each plate having openings therethrough through which extend said lower ends of said rods;
 nuts threaded onto said lower ends of said rods and rigidly securing said plate to said rods;
 said casters each including a rotatable wheel and means supporting same upon said plate for swiveling movement about a vertical axis, said last-named means being secured to said plate at a point offset sidewardly from said rods and extending downwardly away from said lower endless member.

References Cited in the file of this patent

UNITED STATES PATENTS

| | | |
|---|---|---|
| 1,001,416 | Lloyd | Aug. 22, 1911 |
| 2,516,553 | Cole | July 25, 1950 |
| 2,573,085 | Yonkers | Oct. 30, 1951 |
| 2,686,961 | Ellefsen | Aug. 29, 1954 |
| 2,689,133 | Goldman | Sept. 14, 1954 |
| 2,711,906 | Rideout et al. | June 28, 1955 |
| 2,769,230 | Nystrom | Nov. 6, 1956 |
| 2,790,196 | Rideout | Apr. 30, 1957 |
| 2,799,514 | Kramcsak | July 16, 1957 |
| 2,820,642 | Harper | Jan. 21, 1958 |
| 2,917,769 | Kasper | Dec. 22, 1959 |

FOREIGN PATENTS

| | | |
|---|---|---|
| 694,707 | Great Britain | July 27, 1953 |